June 18, 1935.  W. A. LEWIS  2,005,149

OUT-OF-STEP PROTECTION

Filed Dec. 22, 1933  2 Sheets-Sheet 2

WITNESS
Fred P. Wilkes

INVENTOR
William A. Lewis
BY O.B.Buchanan
ATTORNEY

Patented June 18, 1935

2,005,149

UNITED STATES PATENT OFFICE 2,005,149

OUT-OF-STEP PROTECTION

William A. Lewis, Wilkinsburg, Pa., assignor to Westinghouse Electric & Manufacturing Company, East Pittsburgh, Pa., a corporation of Pennsylvania Application December 22, 1933, Serial No. 703,606
20 Claims. (Cl. 175—294)

This invention relates to protective relay systems for synchronous transmission lines, and it has particular relation to means for preventing faulty relaying operations during out-of-synchronism conditions, when the synchronous machines in different portions of the transmission system fall out of step with each other.

Heretofore, rather serious relaying difficulties have been experienced in transmission systems during out-of-synchronism conditions and these difficulties have been multiplied by the large number of properties which are tied together in many large modern transmission networks. Thus, a faulty condition which is essentially entirely local, resulting in an out-of-step condition of a very small part of the total transmission system, may be spread, on and on, by successive faulty relaying operations, until practically the entire transmission system is altogether broken into pieces, usually with insufficient generating capacity in many of the pieces of the system, resulting in very serious power-outages to a great many customers. For many years, the solution of out-of-synchronism difficulties has baffled the designers of protective relaying equipment.

My present invention is directed to means, methods and systems for overcoming the aforementioned difficulties, the nature of which will be subsequently explained more in detail.

In general, my invention contemplates the utilization of some sort of pilot relaying, whether it is continuous carrier-current relaying intermittent carrier-current relaying, or a relaying system utilizing pilot wires or any other communicating channel between the two ends of a line-section to be protected, and my invention is applicable to any one of these systems of relaying.

By way of illustration, I shall describe my invention in connection with a more or less complete relay-system installation in which continuous carrier-current is utilized as the communicating means between the two ends of the protected line-section in order to secure an indication of the simultaneous flow of fault-power into both ends of the line-section being protected. It is to be understood, however, that any equivalent communicating channel, for the purpose outlined, may be utilized.

Figure 1:
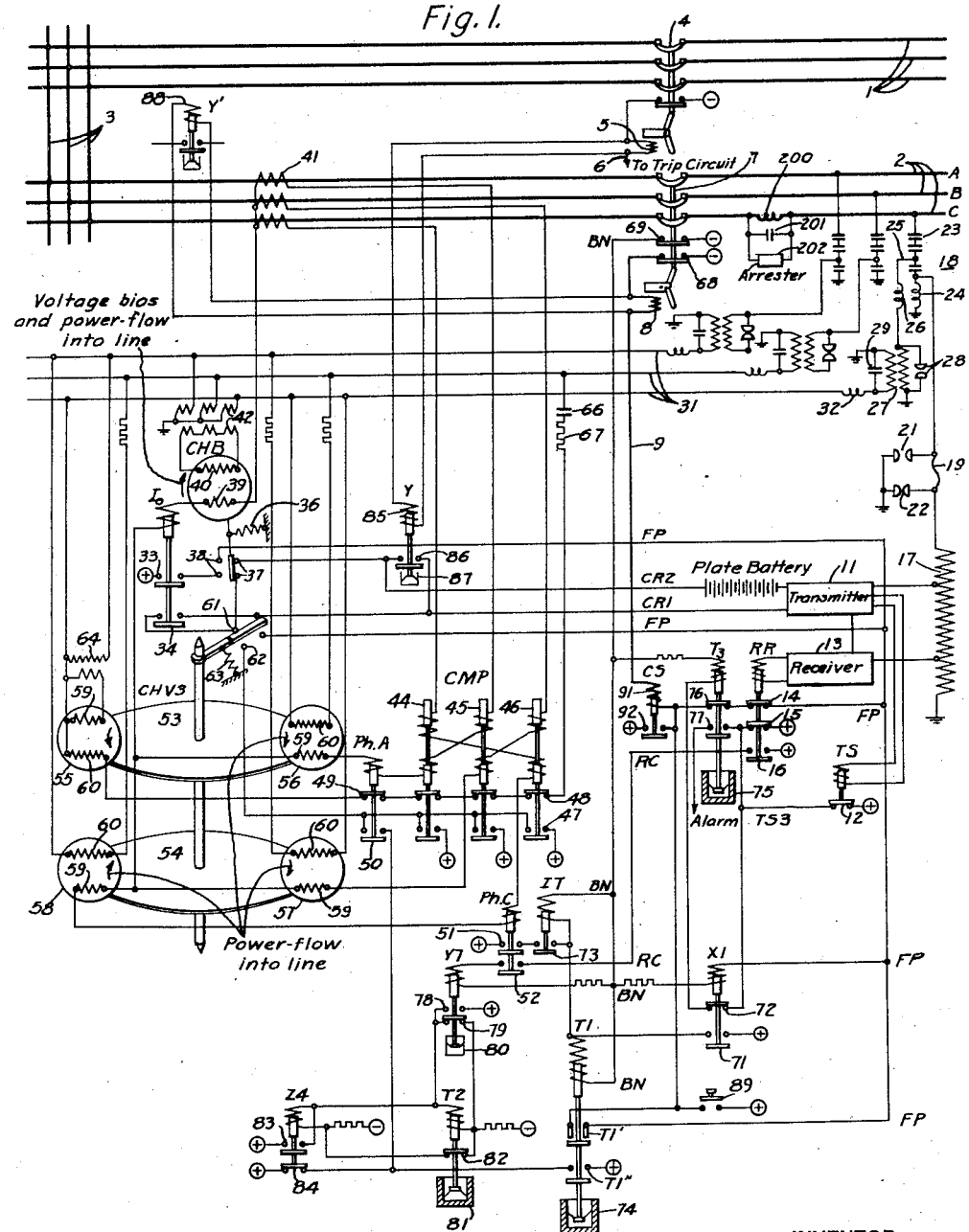
Figure 2:
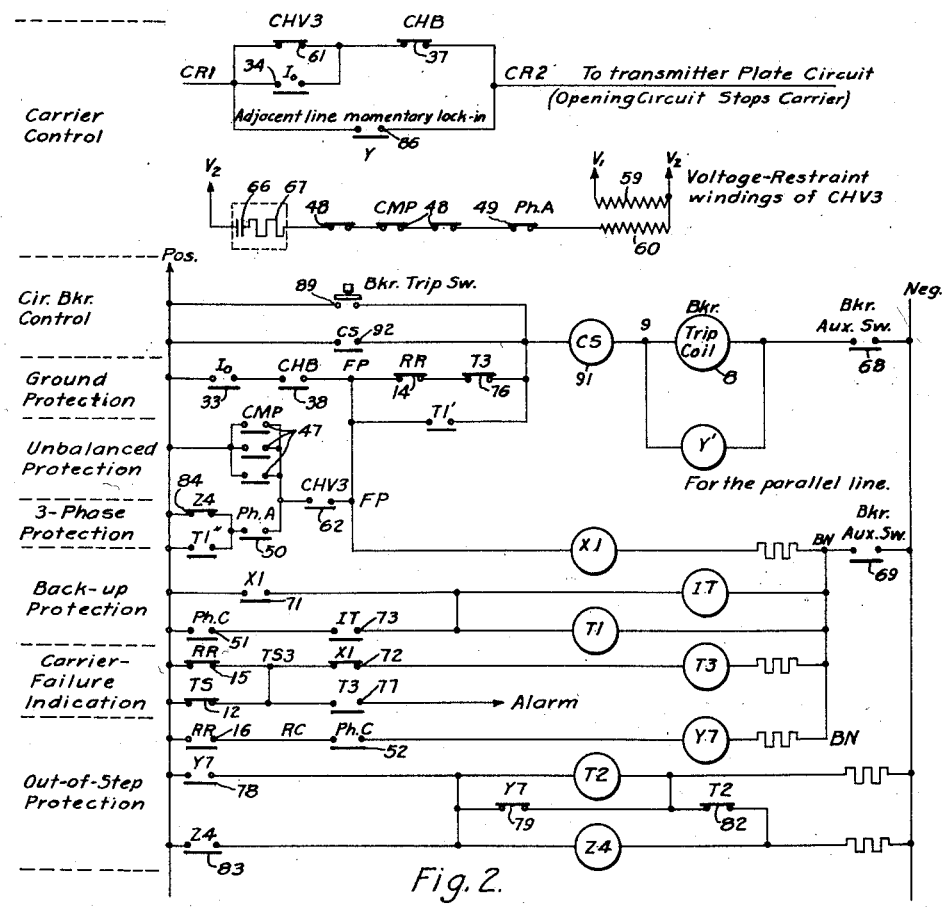
Figure 3:
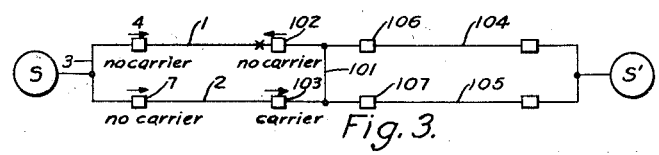
Figure 4:
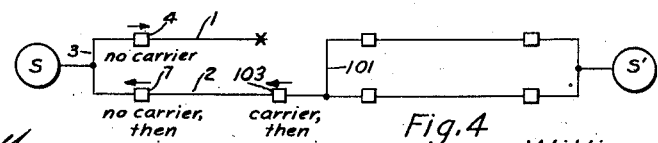

With the foregoing and other objects in view, the invention consists in the systems, combinations, apparatus and methods hereinafter described and claimed and shown in the accompanying drawings, wherein Figure 1 is a diagrammatic view of circuits and apparatus embodying my invention in an illustrative form;

Fig. 2 is a corresponding schematic or across-the-line diagram of the same system; and Figs. 3 and 4 are single-line diagrams referred to in the explanation of the operation.

The invention is illustrated in application to a double-circuit transmission system comprising two three-phase lines, 1, 2, connected to a common bus 3. The relaying equipment is shown in detail for only one end of the line 2, but as both ends of both lines are substantially identical, one illustration and description will suffice for all. The line 1 is provided with a circuit breaker 4 having a trip coil 5 which is energized from a suitable trip circuit 6 not shown in detail, the same being substantially equivalent to the trip circuit which is shown and hereinafter described, for the other line 2.

The line 2 is provided with a circuit breaker 7 having a trip coil 8 and a trip-circuit conductor 9, the control of which embodies the means forming the subject matter of the present invention.

The line 2 has superposed thereon carrier currents of relatively high frequency, as a means for securing instantaneous tripping for all faults in the line-section to be protected. This carrier current is produced, at each end of the line-section, in a transmitter 11 which is indicated schematically by a rectangle, as the details of it are not necessary to an understanding of the present invention. It may be a transmitter similar to that which is shown in the application of William A. Lewis and Robert D. Evans, Serial No. 660,342, filed March 11, 1933, for Protective relay systems. The transmitter is provided with a plate circuit CR1—CR2, the opening of which instantly interrupts the transmission. The transmitter is also provided with a transmitter supervisory relay TS having back- or break-contacts 12 which are broken when the relay is energized and made when the relay is deenergized, as described and claimed in the Lewis and Evans application just mentioned.

The carrier-current equipment at each end of the line 2 also includes a receiver 13 which is indicated only schematically, but it may be substantially as shown and described in the aforementioned Lewis and Evans application. The receiver 13 serves to energize a receiver relay RR having two back- or break-contacts 14 and 15 and one front- or make-contacts 16, the break-contacts 14 and 15 being opened when the receiver relay RR is energized, and the make-contact 16 being closed when the receiver relay RR is energized.

The transmitter and receiver 11 and 13 are coupled to phase-conductor C of the transmission line 2 by means of tap connections on an inductor or autotransformer 17, and a combined coupling capacitor and capacitor potentiometer designated in its entirety by the numeral 18, which constitutes the subject-matter of an application of Paul O. Langguth and William L. Lewis, Serial No. 703,608, filed December 22, 1933, for a Coupling capacitor system.

Interposed between the inductor 17 and the coupling device 18 is a fuse 19, the terminals of which are connected to ground through gap devices 21 and 22. Gap 22, which is connected to the terminal of the inductor 17, is set closer than gap 21 so that, in case a high voltage should reach the coupling lead, the gap 22 would discharge first and divert the surge to ground. In case of power current following the discharge, the rush of current through the fuse 19 to this gap 22 would blow the fuse. Upon the blowing of the fuse 19 the voltage across the other gap 21 would then rise to a value sufficient to discharge this other gap, thus permitting the fuse to clear, and isolating the carrier-current equipment. The arc across the gap 21 may continue until it is cleared by the circuit breakers at the ends of the line.

The carrier-current equipment is illustrated as being connected from the phase-C conductor of the line, to ground.

The coupling-capacitor equipment includes a string of capacitors 23 which are connected between the phase-C conductor and a drain coil 24, the other terminal of which is grounded, the carrier-frequency coupling connection being made between the drain coil and the last capacitor unit of the string 23. The same capacitor string is utilized as a capacitor-potentiometer which is tapped off at an intermediate point 25, from which a circuit is lead through a choke coil 26 to a potential transformer 27 which is protected by a gap device 28. The secondary circuit of the potential transformer is, or may be, shunted by a capacitor 29 which aids in the adjustment of the secondary voltage and also improves the voltage regulation of the device.

It will be understood that all three phases of the line 2 are provided with capacitor voltage equipments 18 similar to that just described for phase C, except that the carrier-current connection is utilized only in phase C. By this means, potential is supplied for a three-phase relaying-voltage line 31, the three conductors of which are connected to the respective secondary circuits of the potential transformers 27 through inductors 32, respectively, which provide tuned relaying-voltage circuits so as to compensate for the phase-angle displacement across the capacitor unit or units between the intermediate tap 25 and ground.

The relaying equipment utilized in the system illustrated comprises the following elements.

An instantaneous ground overcurrent relay Io. This relay has two make-contacts 33 and 34.

An instantaneous ground directional relay CHB. This may be either of the induction-disc type or of the galvanometer type, the latter constituting the subject-matter of a Goldsborough Patent 1,934,664, patented November 7, 1933. This ground directional relay is provided with two torques, both tending to operate the relay against the pull of a light restraining spring 36. One torque is a voltage-bias torque produced by voltage alone, and the other torque is a power-directional torque produced by the product of ground current and residual voltage multiplied by the sine of some predetermined angle plus the angle existing between the ground current and the residual voltage. The voltage torque is strong enough to actuate the relay when the residual voltage exceeds a predetermined value, but it is not so strong that it will overcome the directional torque whenever a current exceeding the minimum operating point of the overcurrent element Io is flowing in the reverse direction. The ground directional element CHB is provided with one break-contact 37 and one make-contact 38. It is provided with a current winding 39 and a voltage winding 40, which are energized, respectively, from the neutral circuits of a set of line-current transformers 41 and a residual potential transformer 42.

An instantaneous unbalanced-current relay CMP. This relay consists of three mechanically independent elements 44, 45 and 46 each having a current-responsive actuating coil and a current-responsive restraining coil, so that each element responds to the difference between two of the line-currents supplied by the current transformers 41. Each of the three elements of the instantaneous unbalanced-current relay CMP has one make-contact 47 and one break-contact 48.

Two instantaneous phase overcurrent relays Ph. A and Ph. C. The Ph. A relay is energized from the phase-A line-current supplied by the current transformer 41, and is provided with one break-contact 49 and one make-contact 50. The Ph. C element is energized in accordance with the phase-C line-current that is supplied by the current transformer 41. This relay element is provided with two make-contacts 51 and 52 respectively.

An instantaneous phase directional relay CHV3. This relay is composed of four torque-producing elements mechanically coupled together, so that the torques add algebraically. Each torque-producing element may be of either the induction-disc type or the galvanometer type, as previously explained in connection with the ground directional relay CHB. For convenience of illustration, the instantaneous phase directional relay CHV3 is shown as comprising two discs 53 and 54 which are operated on by four magnetic elements 55, 56, 57 and 58 of a common watt-meter type, each comprising a heavy, current-winding 59 and a voltage-winding 60. The instantaneous phase directional relay CHV3 is provided with break-contacts 61 and make-contacts 62, and it is also provided with a light actuating spring 63 which tends to actuate the relay into a position in which the break-contacts 61 are opened and the make-contacts 62 are closed.

The instantaneous phase directional relay CHV3 is normally held against the operation of the spring 63, so that the break-contacts 61 are normally closed, as illustrated, and the make-contacts 62 are normally open, as illustrated, by means of voltage restraint which is provided by the watt-meter element 55. The current coil 59 of this element is energized in accordance with the phase-AC voltage of the voltage-supply line 31, by means of a suitable step-down transformer 64 for the purpose of converting from the high-voltage, low-current supply characteristic of a voltage coil, to the high-current, low-voltage supply characteristic of a current coil. The current coil 59 is utilized because of its much better space factor than is obtainable with a voltage coil, this being due to the fact that a current coil consists of a large conductor having only a few turns and very light insulation, so that much less space is taken by insulation, relative to the space occupied by copper, when a current coil is utilized. This makes it possible to utilize a smaller watt-meter element 55 than would be the case if it were provided with two voltage coils instead of one voltage coil and one current coil.

The voltage coil 60 of the voltage-restraint wattmeter element 55 is energized in accordance with the phase -BC voltage of the voltage-supply conductors 31, in series with the break-contact 49 of the instantaneous phase overcurrent relay Ph. A and the three break-contacts 48 of the instantaneous unbalanced-current relay CMP, all connected in series, and it may be connected also in series with an external impedance device which may consist of a capacitor 66 and a resistor 67 which introduces a factor equal to the sine of the angle $\phi$ between the phase -AC and phase -BC voltages, so that sin $\phi$ becomes zero when the phase -AB voltages collapse.

The voltage-restraint torque produced by the wattmeter element 55 is thus the product of three factors, namely, the phase-AC voltage, the phase-BC voltage and the phase-AB voltage, so that the voltage-restraint is proportional to the area of the delta-voltage triangle of the line-voltages, and becomes zero whenever any one of these three delta-voltages becomes zero.

The power-directional torques produced by the three other wattmeter elements 56, 57 and 58 of the instantaneous phase directional relay CHV3 are all in a direction to actuate the relay so as to open the break-contacts 61 and close the make-contacts 62, when power is flowing into the line in the corresponding phase, A, B or C thereof, as will be readily understood from the connections illustrated. The wattmeter element 56, for instance, has its current coil 59 energized in accordance with the phase-A line-current as supplied by the current transformer 41, and it has its voltage element 60 energized in accordance with the phase-BC line-voltage as supplied by the voltage-supply line 31.

In addition to the foregoing equipment, the following auxiliary elements are utilized.

Two auxiliary switches 68 and 69 carried by the circuit breaker 7. These are closed when the circuit breaker is closed and open when the circuit breaker is open. The auxiliary switch 68 is in series with the trip coil 8 so as to open the latter when the circuit breaker is open. The auxiliary switch 69 is connected between the negative bus and an auxiliary breaker-position-responsive negative bus BN, to which some of the hereinafter-mentioned auxiliary relaying equipment is connected.

An instantaneous auxiliary relay X1. It is energized whenever there is an indication of current of fault-magnitude, and a direction of power-flow from the bus 3 into the line 2. It has one make-contact 71 and one break-contact 72.

An instantaneous auxiliary relay IT. This is an instantaneous element associated with the back-up timer T1, about to be described. It has one make-contact 73.

A back-up timer T1. This is arranged to move slowly in the actuating direction, and to return to its initial position promptly, as is indicated in the showing of a dashpot 74 connected to this timer relay T1. It has two make-contacts T1' and T1", of which the former may be so disposed that the contacts are made before the T1" contacts are made, although this difference in time is not essential, as will be hereinafter pointed out in the explanation of the circuit-connections and operation of the device.

A carrier-failure timer T3. This is provided with a dashpot 75 or any equivalent means for producing a slow pick-up response. It is provided with one break-contact 76 and one make-contact 77.

An auxiliary relay Y7. This has one make-contact 78 and one break-contact 79. It preferably has a slow pick-up of the order of three cycles of the line-frequency, or more, as indicated by the light dashpot 80 thereon, although this time delay is not vitally necessary, as will be explained in connection with the explanation of the operation hereinafter.

An out-of-step time lock-out relay T2. It has a drop-out time long enough to allow the two ends of the line-section to pass through their out-of-phase condition while the line losses are being supplied by both ends, this drop-out time being possibly of the order of 10 or 15 cycles to a second, as will be subsequently described, and being obtained by means of a dashpot 81 or any other timing means. This time lock-out relay T2 is provided with one break-contact 82.

An out-of-step auxiliary relay Z4. This has one make-contact 83 and one break-contact 84.

An auxiliary carrier-maintaining relay Y. This has its operating coil 85 energized either in parallel or series with the trip coil 5 of the circuit breaker 4 for the parallel line 1, the parallel connection being shown, that is, the relay coil 85 being connected in parallel to the trip coil 5. This relay has one make-contact 86. It is provided with any suitable means for giving it a short hesitation of about three cycles in its drop-out time, as indicated by the light dashpot 87. The drawings also show the corresponding relay Y' for the parallel line 1, the same having its operating coil 88 connected in parallel to the trip coil 8 of the circuit breaker 7 for the line 2.

A tripping push button 89.

A contactor CS. This is for the purpose of by-passing the light relay-contacts which initially energize the trip-coil circuit 9, so as to prevent damage due to the heavy tripping current. This contactor CS has its operating coil 91 connected in series with the trip coil 8 of the circuit breaker and it has one make-contact 92 which seals-in the contactor and keeps the trip circuit 9 energized until the current is finally interrupted by the auxiliary switch 68 on the breaker.

The circuit connections of the above-described equipment are all shown in Fig. 1 and are summarized also in the schematic diagram of Fig. 2, which may be referred to for convenience in tracing out the operation of the apparatus.

Normally the instantaneous unbalanced-current relay CMP and the instantaneous overcurrent relay Ph. A are in the deenergized position, with their back contacts 48 and 49 closed, thus maintaining voltage restraint on the phase directional relay CHV3 at each end of the line-section 2. The voltage restraint is sufficient to overcome the action of the relay spring 63 and to prevent the power-directional torques produced by normal loads from operating said relay CHV3, so that the relay contacts 61 and 62 are normally in the positions shown.

Similarly, the ground directional relay CHB is normally deenergized by reason of the absence of residual power, as is also the ground overcurrent relay Io, so that the contacts of these relays are also in the positions shown, and this holds true for both ends of the line-section 2.

Reference to the top of Fig. 2 will show that these conditions normally maintain the plate circuit CR1—C2 of the transmitter 11 at each end of the line, and keeps the carrier current on the line.

Reference to the "Ground protection" trip circuit in Fig. 2 will show that the normally instantaneous trip circuit includes the ground-overcurrent-relay make-contact 33 and the ground-directional-relay make-contact 38 in series, so that both of these contacts must be closed before either one can energize an auxiliary fault-responsive positive bus FP.

The remainder of the trip circuit includes the receiver-relay break-contact 14 and the carrier-failure-timer break-contact 76 in series, from which the circuit is continued to the coil of the contactor CS and thence to the trip-circuit conductor 9, the trip coil 8, and the auxiliary breaker-switch 68 to the negative terminal.

As shown in Fig. 2 under the subject of "Unbalanced protection", the auxiliary fault-responsive positive bus FP may also be energized by the closure of any one of the make-contacts 47 of the unbalanced-current relay CMP, the three make-contacts 47 being connected in parallel to each other and in series with the make-contact 62 of the phase directional relay CHV3. It will be understood that it is necessary for the phase-directional-relay make-contact 62 to be closed before the auxiliary fault responsive positive bus FP is energized by the actuation of any one of the three elements comprising the unbalanced-current relay CMP.

In Fig. 2, under the head of "Three-phase protection", a circuit is also provided from the positive bus through the break-contact 84 of the auxiliary out-of-step relay Z4, in series with the Ph. A make-contact 50, thence to the CHV3 make-contact 62. The out-of-step relay contact 84 of the relay Z4 is shunted by the make-contact T1" of the back-up timer T1.

Under normal conditions, the receiver relay RR at each end of the line-section 2 is energized, so that its break-contact 14 is open, thereby interrupting the trip circuit, independently of the condition of the relay contacts interposed between the positive bus and the auxiliary fault-responsive positive bus FP.

When there is a fault involving ground, the instantaneous ground overcurrent relays Io in the line-sections adjacent to the fault will operate, closing the make-contacts 33 and 34. The make-contact 34 by-passes the phase directional break-contacts 61, thus giving preference to the ground relays in the control of the carrier current. This preference is desirable because load power may flow past a single line-to-ground fault, to a load beyond the fault, in sufficient amount to over-balance the torque due to the fault current, thus making it possible for one or more of the phase directional relays CHV3 which are located at various points on the system to give an incorrect indication of the fault direction under this condition. Thus, if this ground-fault preference is not inserted by the ground-current-responsive make-contact 34, the improper opening of one of the phase directional relay contacts 61 in any line-section would result in the interruption of the transmission of carrier current at a point where it should be maintained in order to provide correct relaying.

The improper operation of the phase-directional relay CHV3 is permitted by reason of the fact that a high value of ground current in one phase may actuate one or more of the Ph. A or CMP relay elements in series with the voltage-restraint winding 60 and remove the voltage restraint from the phase directional relay, allowing it to be operated by the load power, and if the fault is not in the line-section in question, the load power will be flowing into the line at one end and out of the line at the other, so that improper operation will be obtained at one end.

In case a ground fault occurs on the protected line-section 2, the ground overcurrent relays Io will be operated at both ends of the section. The ground directional relays CHB will also be operated at both ends, thus opening the plate circuits of the carrier-current transmitters and stopping transmission at both ends. This causes the receiver relays RR at both ends to be deenergized, thus closing their break-contacts 14 and completing the trip-circuits through the contacts 33 and 38 of the ground overcurrent relay Io and the ground directional relay CHB at each end of the line.

If the fault involves more than one conductor and the ground fault-current is insufficient to operate the ground overcurrent relay Io, the control of the carrier-current transmission resides in the phase directional relay CHV3. If the fault is in the protected line-section 2, the phase directional relay CHV3 at each end of the section will interrupt the transmission of carrier current, this relay being now free to operate because of the removal of voltage restraint by reason of the low voltage due to the fault itself or by reason of the removal of all voltage restraint by the actuation of the Ph. A relay or one of the CMP relay elements. As soon as carrier is removed from both ends of the line-section, the receiver relay RR at each end will be deenergized, closing its break-contact 14 and completing the trip circuit, in this case, through the contact 62 of the phase directional relay and the contacts 47 or 50 of the unbalanced current relay CMP or the Ph. A relay, according as the fault is an unbalanced fault or a three-phase fault.

Under some extreme conditions of system operation, it may happen that the fault currents flowing to the fault from one end of the line will be insufficient to operate the overcurrent relays at that end, until after the circuit breaker at the opposite end has opened. In order to permit instantaneous tripping at said opposite end, however, it is necessary that the transmission of carrier current be interrupted at both ends. This is accomplished at the end carrying the small current as follows, as set forth and claimed in an application of William A. Lewis, Ser. No. 703,607, filed December 22, 1933, for Continuous carrier relaying.

In case the fault is a single line-to-ground fault, the polyphase voltage will always be distorted, so that there will be sufficient residual voltage to produce a voltage-bias in the ground directional relay CHB which will overcome the restraining spring 36 and operate the relay, under conditions when there is little or no ground current and hence little or no power directional torque in either direction. The ground directional relay will, therefore, be operated by residual-voltage bias, because the ground current is small, and the back contact 37 will be opened under this condition, thereby interrupting the carrier-current transmission. At the opposite end of the line there will necessarily be ground current as well as residual voltage, so that the apparatus will perform in the usual manner, as previously described, and the tripping will occur at that end as soon as the receiver-relay contact 14 closes. As soon as the circuit breaker opens, clearing the fault at the end carrying the fault current, the current at the end which originally carried the small amount of fault current will usually rise above the tripping value and tripping will follow immediately.

If the fault involves more than one conductor, one or more of the phases of the delta voltage at the end carrying the small current will be reduced to a low value, thereby removing the voltage-restraint from the phase directional relay CHV3, and this relay will be operated by its spring 63, aided by the slight power-directional torque produced by the small value of fault-current. The operation of this relay opens the contact 61 and since the ground current is small, the ground overcurrent relay contact 34 will remain open, so that the transmitter plate circuit will be interrupted, thus interrupting the operation of the carrier-current transmitter at that station. In other respects, the clearing of such faults is similar to the clearing of the ground faults just discussed.

In the case of an external ground fault producing ground current flowing in the direction from the bus 3 into the line 2, but where the fault is located externally of the line-section 2, the ground directional relay CHB at the bus 3 will be actuated, opening its contact 37 and interrupting the transmitter plate circuit, thus interrupting the operation of the carrier-current transmitter 11 at that station. At the other end of the line-section 2, however, the ground power-flow will be from the line to the bus, so that the ground directional relay CHB at that station will not be actuated, the torque being in the direction to keep its normally closed contacts 37 closed more tightly, so that the carrier-current transmission at this station will be maintained. Therefore, the receiver relays RR will remain energized at both stations and will keep the trip circuits open at the relay contact 14 at both stations.

In the case of a multi-conductor fault at the same location, which does not involve ground or in which the ground current is so small that the ground overcurrent relay Io is not actuated, the operation will be as follows. At the station shown in the drawings, fault power flowing from the bus 3 into the line 2 will cause the operation of the phase directional relay CHV3 in the normal manner, and since the ground overcurrent relay Io is not actuated, the opening of the phase directional relay contact 61 will interrupt the transmitter plate circuit and thus interrupt the carrier-current transmitter at this station, but the carrier-current transmission will be maintained at the station at the other end of the line-section 2, so as to prevent tripping.

In case of external faults outside of the line section 2 but in such direction that the fault power is flowing from the line into the bus 3, the operation will be the same as described above, except that the stations at the two ends of the line-section 2 will be interchanged in the description.

Out-of-synchronism conditions, as pointed out at the outset of this specification, have, in times past, presented a difficulty, in any kind of pilot relaying, whether utilizing continuous carrier, intermittent carrier, or pilot wires, because, at one or more points in the transmission system, which are called electrical centers, it may appear that power is flowing into these points just as if there were a three-phase fault at each of these points, so that any relaying system responsive to three-phase faults would respond to such out-of-synchronism conditions so as to trip out the line-sections containing these electrical centers of the distribution system.

In accordance with my invention, means have been provided for affording out-of-step protection, and preventing faulty relaying operations under these conditions.

During the early stages of out-of-step operation, the two ends of each line-section begin gradually to swing apart in phase, increasing the phase-angle between the two ends until exact phase opposition is reached at 180° and then on through to 360°, and then repeating the cycle, requiring a time which may be of the order of a second or several seconds to complete a cycle, dependent upon the system-constants and the operating conditions of the system.

Out-of-synchronism conditions are recognized by the fact that, during the early stages, power flows through each line-section from one end to the other in a manner similar to an external fault, the current increasing from load-magnitude to fault-magnitude as loss of synchronism is approached. As the power-sources feeding the two ends of the line-section reach approximate phase-opposition, there will be no change in power-flow in those sections which do not contain an electrical center.

But where an electrical center of the system falls in any particular line-section, there will be a brief period in the out-of-synchronism cycle of the transmission system, lasting from just before until just after the 180° phase position is reached, when the losses of the line are being supplied at both ends of the line-section, so that power of fault-magnitude flows into such a line-section from both ends, thus momentarily simulating an internal three-phase fault. This is a condition of unstable equilibrium and will not be maintained, returning again to a through-power condition, with power flowing in at one end and out at the other end of the line-section, soon after the condition of exact phase-opposition is past, so that if the tripping sequence of the three-phase fault-responsive devices is momentarily opened by a time-delay relay energized before the condition of phase-opposition is reached, tripping will be prevented.

In the illustrated relaying system, as the two sources pull out of synchronism, power flows through the relayed section 2 at the same time that current of fault-magnitude is approached. Under this condition, the voltage restraint is removed from the phase directional relays CHV3, and carrier is removed from the end where power flows into the section. At the other end of the section, however, power is flowing out, and consequently carrier is maintained at that end. This condition is recognized by the continuance of a three-phase over-current for a time long enough for the fault to have been cleared, wherever it was, if the overcurrent had been caused by a fault anywhere on the system.

Referring to Fig. 2, under the heading of "Out-of-step protection", it will be noted that a relay Y7 is provided, having a slightly delayed pick-up action so that it will be actuated if the receiver relay RR remains energized, so that the RR contact 16 stays closed, for a predetermined time after an overcurrent condition exists, as indicated by the picking up of the overcurrent relay Ph. C which closes its contact 52. The time-hesitation in the pick-up of the relay Y7 need be only of the order of two or three cycles of the fundamental line frequency, or slightly more, so that if the over-current condition arose as a result of an internal fault in the protected line-section, tripping could occur, as will be subsequently pointed out. It will be observed that the tripping circuit of the relay Y7 extends from the positive bus, through the receiver-relay contact 16, to the conductor RC, thence to the Ph. C relay-contact 52 and the operating coil of the relay Y7 to the auxiliary breaker-position-responsive negative bus BN which is connected to the negative bus by the breaker auxiliary switch 69 as long as the breaker remains closed.

As soon as the out-of-step relay Y7 picks up, it closes its contact 78 and thus completes a circuit from the positive bus to the tripping coils of both the out-of-step time lock-out relay T2 and the auxiliary out-of-step relay Z4. The energization of the relay Z4 immediately closes a holding circuit through the Z4 relay-contact 83, by-passing the Y7 relay contact 78. The relay Z4 also interrupts the three-phase fault-responsive tripping circuit by reason of the opening of the Z4 relay contact 84. The Z4 relay pick-up time, from the first energization of the Y7 coil, that is, from the first actuation of the overcurrent relays Ph. A and Ph C, must be longer than it would take to close the trip contact 92 of the contactor CS in case of a three-phase fault, which may be of the order of two cycles.

The out-of-step timing relay T2 is of the instantaneous pick-up type, with time-delay reset. Its actuating coil is by-passed by the Y7 relay-contact 79 which closes when the Y7 relay is deenergized. The T2 relay has a back contact 82 which closes after a predetermined time-delay upon the deenergization of the relay T2, and the circuits are such that when the back-contacts 79 and 82 of both Y7 and T2 are closed the actuating coil of the Z4 relay will be short-circuited, thus deenergizing the latter, reclosing the Z4 back-contact 84 in the tripping circuit, and opening the Z4 holding circuit at 83.

If there is not an electrical center in the line-section 2 being protected, the receiver-relay front-contact 16 will remain closed throughout the out-of-synchronism condition, and the overcurrent relay Ph. C contact 52 will remain closed until near the end of the out-of-synchronism cycle, when the two sources at the two ends of the line will again approach in-phase position. As the two sources vary in speed, they will change successively from in-phase position to out-of-phase position, resulting respectively in the alternate deenergization and energization of the Y7 relay, following the slip frequency. There is no need for out-of-step protection under these circumstances, because we have assumed a line-section in which there is no electrical center and hence in which there is never a condition of the simultaneous flowing of power of fault-magnitude into both ends of the line section.

If an electrical center of the transmission system should fall within the line-section 2 being protected, there will be a brief time, near the condition of exact phase-opposition of the two sources, when power of fault-magnitude will flow into both ends of the line-section, thus operating both of the phase directional relays CHV3 and interrupting carrier-current transmission at both ends, so that each of the receiver relays RR is deenergized. The deenergization of the receiver relay RR opens its contact 16 and deenergizes the Y7 relay, thus short-circuiting the energizing coil of the T2 relay by the closure of the Y7 relay back contact 79.

The T2 relay then starts to drop out, and its drop-out time (plus the Y7 relay drop-out time) must be of the order of 10 or 15 cycles to a second, or long enough to permit riding over that portion of the out-of-step cycle in which the relaying conditions are similar to an internal three-phase fault, or until the phase directional relays CHV3 at the two ends of the line-section again register an external fault, that is, with one of the relays registering power flowing into the line and the other registering power flowing out of the line, thus restoring carrier-current transmission to one end of the line, picking up the receiver relays RR at both ends of the line. At this time, the Y7 relay is again energized, thus removing its short-circuit 79 from the operating coil of the T2 timing relay and permitting the latter relay to move its back-contact 82 wide open before it has had time to become closed. The T2 timing relay will thus be kept in its energized position, and its back-contact 82 will not close during the out-of-synchronism condition. As long as the T2-relay back-contact 82 does not close, the Z4 relay will remain energized and will, in turn, prevent tripping by reason of its open back-contact 84 in the tripping circuit of the three-phase fault-responsive device.

It has been recognized that an out-of-step condition may simulate a three-phase fault not involving grounds and that, therefore, the unbalanced-current fault-responsive relay, as well as the ground protection, will not be involved. Reference to Figs. 1 and 2 of the drawings will show that the Z4 relay contact 84 is in series with only that portion of the tripping circuit which is responsive to three-phase faults. It does not interfere with the response to unbalanced phase faults or ground faults. Thus, if either a ground fault or an unbalanced phase fault should occur during out-of-synchronism conditions, the fault will be cleared instantly just as if the out-of-synchronism condition did not exist. If a three-phase fault should occur during out-of-synchronism conditions, it cannot be cleared until the T2 timer closes its back contact 82, thereby short-circuiting the operating coil of the Z4 relay and closing the back-contact 84 of the latter. This would involve the time-delay which is inherent in the drop-out time of the T2 timing relay.

It will now be appreciated why the Y7 relay should have a somewhat slow pick-up of at least two or three cycles, or why the overall pick-up time of the Z4 relay, from the beginning of the energization of the Y7 coil, must be of the order of two or three cycles, or longer than it takes to close the trip contacts 92 of the contactor CS in case of a three-phase fault, which is of the order of two cycles. This is so, because as soon as the Z4 relay picks up, its back-contact 84 opens and prevents tripping as a result of a three-phase fault.

The relaying system shown in the drawings also provides for back-up protection. Referring to Fig. 2, under the heading of "Back-up protection" it will be noted that the XI relay coil is energized whenever the energization of the auxiliary fault-responsive positive bus FP indicates the presence of a fault with fault-power flowing from the bus 3 into the line 2. The energization of the operating coil of the XI relay is completed from the FP bus, through this XI coil, to the auxiliary negative bus BN.

Whenever there is current of fault-magnitude, accompanied by fault power-direction from the bus to the line, whether the fault is an internal fault within the line-section 2, or an external fault outside of it, the XI relay will be energized, and its front-contact 71 will energize the operating coils of both the back-up timer T1 and its instantaneous auxiliary relay IT. The front contact 73 of the instantaneous relay IT will complete a holding circuit for the relay IT and the timer T1, provided that it is a three-phase fault which actuated the XI relay, as indicated by the energization of the Ph. C relay, resulting in the closure of the Ph. C relay-contact 51. This holding circuit 51—73 is necessary in order to maintain the energization of the T1 timer even after the interruption of the energization of the fault-responsive relay XI because such an interruption of XI may be brought about by the actuation of the relay Z4 of the out-of-step protective system. By this means, the timer T1 will remain energized after the energization of the out-of-step protective elements.

Thus, if there were a three-phase fault in the second line-section, that is, in the line-section to the right of the right-hand end of the line-section 2 shown in the drawings, the operation of the back-up protective features on the line 2 would not be cut-off by the Z4 out-of-synchronism relay.

The back-up timer T1 is set to have a time of operation long enough to permit normal tripping in the second section, for example, if the fault is in the second section, whether the fault is a ground fault, an unbalanced fault, or a three-phase fault. This time will include both the relay time and the necessary circuit-breaker time, it being understood that quick-acting circuit breakers, as quick as three cycles or even less, will be utilized. If the fault is not cleared in a predetermined time which is longer than that necessary for it to be cleared if the relaying equipment is operating properly, the back-up timer T1 will close its first contact T1' which by-passes the circuit containing the receiver-relay back-contact 14 and the carrier-failure-timer back-contact 76, so that tripping will be effected even though carrier current is not removed from the line, that is, even though the receiver relay RR remains energized, with its back-contact 14 open.

At the close of the pick-up movement of the back-up timer T1, it closes its second contact T1'', which by-passes the Z4 contact 84 of the out-of-step protection, and makes it possible to clear a three-phase fault through the back-up tripping contacts T1'' and T1'. The time-delay in the closure of the T1'' contact may be very great, of the order of several seconds or even minutes, in order to insure that the circuit breaker 7 is not tripped during the continuance of any possible or probable out-of-synchronism condition. No such great time-delay is necessary, however, in the back-up protection for faults involving grounds or unbalanced currents, and hence the T1' back-up timer contacts may close in a much shorter time, merely long enough to permit the fault to be cleared by some other circuit breaker, if it is going to be cleared at all, before the operation of the back-up timer contact T1' makes it possible to clear the fault by means of the circuit breaker 7 which is being controlled.

An important advantage of the continuous carrier system over the intermittent carrier system is that the continuous carrier system may readily embody means for quickly indicating any fault in the carrier-current apparatus, whether transmitter or receiver, as soon as it occurs, whereas, in an intermittent carrier system, such a fault may not become evident until an occasion arises for putting the carrier onto the line in order to prevent tripping, in which case its failure will result in a faulty tripping operation, which is the first notice which the station-operator has of the carrier-current failure. The carrier-failure indication shown in the drawings is similar to that which is shown and covered in the previously mentioned Lewis and Evans application Serial No. 660,342.

Referring to Fig. 2 of the accompanying drawings, under the heading of "Carrier failure indication", it will be noted that a circuit is completed from the positive bus to a conductor marked TS3 upon the deenergization of either the receiver relay RR of the transmitter supervisory relay TS, closing their back contacts 15 and 12 respectively. If, at the same time that the TS3 conductor is energized, there is not a fault on the line-side of the bus 3, the XI relay will not be energized, and the back-contact 72 of the latter will be closed, completing a circuit from the TS3 conductor to the operating coil of the carrier-failure timer T3, from which the circuit is completed to the auxiliary negative bus BN. After a suitable time-delay, which is longer than the longest tripping time of the back-up protection, the carrier-failure timer T3 will complete its pick-up movement and will close its front-contact 77, completing a circuit from the TS3 conductor to an alarm, at the same time opening its back-contact 76 in the tripping circuit, thus permanently locking out the receiver-relay tripping-contact 14 and thereafter permitting tripping only as a result of the back-up protection afforded by the T1' contact, until the station-attendant, aroused by the alarm, has had time to discover and correct the cause of the carrier-failure.

The illustrated protective relay system includes another feature which is designed to afford protection in the event of a sudden reversal of fault-current in a sound line when the line breakers at the two ends of a faulty line do not open simultaneously. This condition will be made clear by reference to the single-line diagrams of Figs. 3 and 4, wherein a transmission system is shown involving a source S, feeding a bus 3 which, in turn, feeds line-sections 1 and 2 through circuit breakers 4 and 7 respectively.

The opposite ends of the line-sections 1 and 2 are connected to a bus 101 through circuit breakers 102 and 103 respectively, and the bus 101 is, in turn, connected to additional line-sections 104 and 105 through breakers 106 and 107. The far ends of the line-sections 104 and 105 are connected eventually to a second source S'.

Referring to Fig. 3, if a fault occurs at X, near the far end of the parallel line-section 1, the fault-power will flow in the direction shown by the arrows. It will be noted that the power-flow is from the buses 3 and 101, respectively, into the faulty line 1, at both ends, so that carrier is removed from both ends, and instantaneous tripping is permitted. In the sound line 2, however, the fault-power is flowing from the bus 3 into the line, thus removing carrier from that end of the line, but the fault-power is flowing from the line to the bus 101 at the other end, thus maintaining carrier at that end and preventing the tripping of the breakers 7 and 103 at the two ends of the sound line 2.

In the faulty line 1, the tripping circuits of the two circuit breakers 4 and 102 will be substantially simultaneously energized, so that both breakers begin arcing at substantially the same time, but it is almost inevitable that the breaker carrying the heavier current, which would generally be the breaker 102 closest to the fault, would cease arcing a half-cycle or more ahead of the other breaker, or that one breaker would cease arcing in one of its poles before its other poles, so that there would or might be a sudden reversal of fault-current in the sound line.

Thus, if the breaker 102 opens before the breaker 4 in the faulty line, the conditions will be as depicted in Fig. 4. It will be noted, from the arrows, that the current has reversed at both ends of the sound line 2. This means that the far end containing the breaker 103, which was at first maintaining the carrier, so as to prevent tripping, will, if nothing is done to prevent it, stop transmitting carrier as soon as either one of its directional relays CHB or CHV3 backs off of its back-contact 37 or 61, as the case may be. However, at the near end of the sound line 2, where the circuit breaker 7 is located, the directional element CHB or CHV3 which has responded to the fault-power-flow shown in Fig. 3, has moved to the extreme limit of its travel, with its back-contact 37 or 61, as the case may be, wide open, and it has to move much further than the corresponding relay at the far end where the circuit breaker 103 is, before the previously open back-contact can be reclosed, thus restoring carrier. It is almost inevitable, therefore, that there will be a half-cycle or several half-cycles during which carrier will be removed from the sound line 2, thus permitting the tripping of this sound line which should be avoided by all means, if at all possible, because such faulty tripping would be very likely to cause a serious interruption in service.

Means for overcoming this difficulty constitute the subjects-matter of an application of Robert D. Evans and William A. Lewis, Serial No. 703,605, filed December 22, 1933, for a Relaying system with directional indication storage, and an application of Roy M. Smith, Serial No. 703,610, filed December 22, 1933, for Continuous carrier relaying. Both of the applications just mentioned are directed particularly to the problems of continuous carrier-current relaying. Some of the general principles of preventing faulty operation as the result of non-simultaneous operation of breakers or of the different poles of a polyphase breaker are also covered in an application of Edward H. Klemmer, Serial No. 703,609, filed December 22, 1933, for Relaying systems. The particular means shown in the drawings of the present application for overcoming this reversed-power difficulty in continuous carrier curent relaying systems is that which is shown and claimed in the Smith application.

Referring to Figs. 1 and 2 of the accompanying drawings, it will be seen that the carrier-current transmission is protected by an auxiliary relay Y, the operating coil of which is energized whenever the tripping circuit of the breaker 4 in the parallel line 1 is energized, or, in other words, upon the energization of any tripping circuit of any circuit breaker attached to the bus 3, other than the circuit breaker 7 which is being controlled. The auxiliary relay Y is provided with a make-contact 86 which by-passes all of the relay contacts which might open-circuit the transmitter plate circuit of the transmitter 11, thereby insuring the maintenance of carrier-current transmission on the line 2. This Y relay may be provided with means, symbolized by the light dashpot 87, for causing it to delay two or four cycles in its drop-out so as to introduce that much time-hesitation in the carrier-current tripping functions of the sound line 2 after the opening of the circuit breaker 4 in the faulty line 1 under the conditions previously outlined. In the normal operation of the protective equipment for the line 2, the auxiliary relay Y will not be involved, because its operating coil 85 will not be energized in response to a fault involving power-flow from the bus 3 into the line 2.

As is customary in carrier current relaying systems, a suitable carrier-frequency trap is utilized in the phase-conductor or conductors to which the carrier is coupled. In the particular form of embodiment shown in the drawing, this trap consists of an inductance coil 200 shunted by a capacitor 201 and a lightning arrester 202.

While I have shown my invention in a single illustrative form of embodiment, it will be understood that various modifications and alterations may be resorted to, as will be more or less obvious to those skilled in the art, without departing from the general basic principles of my invention. I desire, therefore, that the appended claims shall be accorded the broadest interpretation consistent with their language and the prior art.

I claim as my invention:

1. Protective equipment for a line-section of a polyphase synchronous transmission-line, comprising line-sectionalizing circuit-interrupter means and relaying means therefor at each end of the line-section being protected, each of said relaying means including a directionally responsive quick-acting relaying means for responding selectively to faults and a plurality of different fault-indicating quick-acting relaying means for responding to the presence of different types of faults on the transmission-line, only one of said fault-indicating means being responsive when there is a balanced polyphase fault without ground current, means for providing an intelligence-communicating channel between the two ends of the line-section being protected, auxiliary means associated with said intelligence-communicating channel for selectively cooperating with the directionally responsive means at the two ends of the protected line-section so as to provide a trip-circuit indication of the presence of an internal fault somewhere between the ends of the protected line-section, trip-circuit means, at each end, for quickly actuating the circuit-interrupter means at its end of the protected line-section, said trip-circuit means being responsive to said internal-fault communicating-channel indication and responsive also to an indication of any one of said fault-indicating means, and out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating channel signal-indication condition which would establish the presence of an internal fault somewhere between the ends of the protected line-section.

2. Protective equipment for a line-section of a polyphase synchronous transmission-line, comprising line-sectionalizing circuit-interrupter means and relaying means therefor at each end of the line-section being protected, each of said relaying means including quick relaying means directionally responsive to certain faults, means for providing an intelligence-communicating channel between the two ends of the line-section being protected, auxiliary means associated with said intelligence-communicating channel for selectively cooperating with the directionally responsive means at the two ends of the protected line-section so as to respond to conditions of internal faults somewhere between the two ends of the particular line-section being protected for actuating the circuit-interrupter means at both ends of the protected line section, and means responsive to the continuance, for a predetermined time, of a certain predetermined fault-current condition without an actuation of the circuit-interrupter means for temporarily thereafter preventing such actuation in response to an indication of a balanced internal polyphase fault without ground current.

3. Protective equipment for a line-section of a polyphase synchronous transmission-line comprising, line-sectionalizing circuit-interrupter means and relaying means therefor at each end of the line-section being protected, each of said relaying means including a directionally responsive quick-acting relaying means for responding selectively to faults and a current-responsive fault-indicating means responsive at least to the type of fault involving a balanced polyphase current without ground current, a communicating channel between the two ends of the line-section being protected, means responsive to said directionally responsive quick-acting relaying means for transmitting a signal through said communicating channel to the other end of the line-section, means, at each end, responsive to said signal, and responsive also to the direction of power-current flow into the line-section being protected, for quickly energizing a control circuit for the circuit-interrupter means, and means responsive to the continuance, for a predetermined time, of a certain predetermined fault-current condition without an actuation of the circuit-interrupter means for temporarily thereafter preventing such actuation in response to an indication of a balanced internal polyphase fault without ground current.

4. Protective equipment for a line-section of a polyphase synchronous transmission-line, comprising line-sectionalizing circuit-interrupter means and relaying means therefor at each end of the line-section being protected, each of said relaying means including a directionally responsive quick-acting relaying means for responding selectively to faults and a current-responsive fault-indicating means responsive at least to the type of fault involving a balanced polyphase current without ground current, a communicating channel between the two ends of the line-section being protected, means responsive to said directionally responsive quick-acting relaying means for transmitting a signal through said communicating channel to the other end of the line-section, means, at each end, responsive to said signal, and further responsive to the actual presence of a fault on the transmission line, and responsive also to the direction of power-current flow into the line-section being protected, for quickly energizing a control circuit for the circuit-interrupter means, and means responsive to the continuance, for a predetermined time, of a certain predetermined fault-current condition without an actuation of the circuit-interrupter means for temporarily thereafter preventing such actuation in response to an indication of a balanced internal polyphase fault without ground current.

5. Protective equipment for a line-section of a synchronous transmission-line, comprising line-sectionalizing circuit-interrupter means and relaying means therefor at each end of the line-section being protected, each of said relaying means including a directionally responsive quick-acting relaying means for responding selectively to faults, means responsive to the presence of a certain phase-to-phase type of fault, and other means responsive to the presence of at least one other type of fault, a communicating channel between the two ends of the line-section being protected, means responsive to said directionally responsive quick-acting relaying means for transmitting a signal through said communicating channel to the other end of the line-section, trip-circuit means, at each end, responsive to said signal, and further responsive to an indication of either of said types of fault on the transmission-line, and responsive also to the direction of power-current flow into the line-section being protected, for quickly energizing a control circuit for the circuit-interrupter means, and means responsive to the continuance, for a predetermined time, of a certain predetermined fault-current condition without an actuation of the circuit-interrupter means for temporarily thereafter preventing a trip circuit indication of said phase-to-phase type of fault.

6. Protective equipment for a line-section of a polyphase synchronous transmission-line, comprising line-sectionalizing circuit-interrupter means and relaying means therefor at each end of the line-section being protected, each of said relaying means including a directionally responsive quick-acting relaying means for responding selectively to faults, means responsive to the presence of a balanced polyphase fault, means selectively responsive to the presence of a phase-to-phase fault but only if it is not a balanced polyphase fault, and still other means selectively responsive to the presence of ground faults, a communicating channel between the two ends of the line-section being protected, means responsive to said directionally responsive quick-acting relaying means for transmitting a signal through said communicating channel to the other end of the line-section, trip-circuit means, at each end, responsive to said signal, and further responsive to an indication of any one of said types of fault on the transmission-line, and responsive also to the direction of power-current flow into the line-section being protected, for quickly energizing a control circuit for the circuit-interrupter means, and means responsive to the continuance, for a predetermined time, of a certain predetermined fault-current condition without an actuation of the circuit-interrupter means for temporarily thereafter preventing a trip-circuit indication of said balanced polyphase fault.

7. Protective equipment for a line-section of a polyphase synchronous transmission-line, comprising line-sectionalizing circuit-interrupter means and relaying means therefor at each end of the line-section being protected, each of said relaying means including a quick-acting phase directionally responsive relaying means responsive to the phase-to-phase faults, a quick-acting ground directionally responsive relaying means responsive to ground faults, and a plurality of different fault-indicating quick-acting relaying means for responding to the presence of different types of faults on the transmission-line, only one of said fault-indicating means being responsive when there is a balanced polyphase fault without ground current, another of said fault-indicating means being responsive to ground faults, a communicating channel between the two ends of the line-section being protected, means responsive to said differentially responsive quick-acting relaying means for transmitting a signal through said communicating channel to the other end of the line-section, trip-circuit means, at each end, for quickly actuating the circuit-interrupter means at its end of the protected line-section, said trip-circuit means being responsive to said communicating-channel signal, and being further responsive to either a joint internal-fault indication of said phase directionally responsive relaying means and an indication of fault-indicating means including the fault-indicating means which responds to said balanced polyphase fault, or a joint internal-fault indication of said ground directionally responsive relaying means and an indication of said ground-fault indicating means, and out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section.

8. Protective equipment for a line-section of a polyphase synchronous transmission-line, comprising line-sectionalizing circuit-interrupter means and relaying means therefor at each end of the line-section being protected, each of said relaying means including a quick-acting phase directionally responsive relaying means responsive to phase-to-phase faults, a quick-acting ground directionally responsive relaying means responsive to ground faults, a quick-acting fault-indicating relaying means responsive when there is balanced polyphase fault, a quick-acting unbalanced-phase fault-indicating relaying means responsive to phase-to-phase faults but only when said phase-to-phase faults are unbalanced, and a quick-acting ground-fault indicating relaying means responsive to ground faults, a communicating-channel between the two ends of the line-section being protected, means responsive to said directionally responsive quick-acting relaying means for transmitting a signal through said communicating channel to the other end of the line-section, trip-circuit means, at each end, for quickly actuating the circuit-interrupter means at its end of the protected line-section, said trip-circuit means being responsive to said communicating-channel signal, and being further responsive to either a joint internal-fault indication of said phase directionally responsive relaying means and an indication of said balanced-fault indicating means, or a joint internal-fault indication of said phase directionally responsive relaying means and an indication of said unbalanced-phase fault-indicating means, or a joint internal-fault indication of said ground directionally responsive relaying means and an indication of said ground-fault indicating means, and out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section.

9. Protective equipment for a line-section of a polyphase synchronous transmission-line, comprising line-sectionalizing circuit-interrupter means and relaying means therefor at each end of the line-section being protected, each of said relaying means including a directionally responsive quick-acting relaying means for responding selectively to faults and a plurality of different fault-indicating quick-acting relaying means for responding to the presence of different types of faults on the transmission-line, only one of said fault-indicating means being responsive when there is a balanced polyphase fault without material ground current, means for providing an intelligence-communicating channel between the two ends of the line-section being protected, auxiliary means associated with said intelligence-communicating channel for selectively cooperating with the directionally responsive means at the two ends of the protected line-section so as to provide a trip-circuit indication of the presence of an internal fault somewhere between the ends of the protected line-section, trip-circuit means, at each end, for quickly actuating the circuit-interrupter means at its end of the protected line-section, said trip-circuit means being responsive to said internal-fault communicating-channel indication and responsive also to an indication of any one of said fault-indicating means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, and back-up-protection means for providing delayed circuit-interrupter tripping in the event of a long-continued fault-indication, said back-up-protection means including a contact-member which eventually nullifies said out-of-step protective means after a long time-delay.

10. Protective equipment for a line-section of a polyphase synchronous transmission-line, comprising line-sectionalizing circuit-interrupter means and relaying means therefor at each end of the line-section being protected, each of said relaying means including a directionally responsive quick-acting relaying means for responding selectively to faults and a plurality of different fault-indicating quick-acting relaying means for responding to the presence of different types of faults on the transmission-line, only one of said fault-indicating means being responsive when there is a balanced polyphase fault without material ground current, means for providing an intelligence-communicating channel between the two ends of the line-section being protected, auxiliary means associated with said intelligence-communicating channel for selectively cooperating with the directionally responsive means at the two ends of the protected line-section so as to provide a trip-circuit indication of the presence of an internal fault somewhere between the ends of the protected line-section, trip-circuit means, at each end, for quickly actuating the circuit-interrupter means at its end of the protected line-section, said trip-circuit means being responsive to said internal-fault communicating-channel indication and responsive also to an indication of any one of said fault-indicating means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, and back-up-protection means for providing delayed circuit-interrupter tripping in the event of a long-continued fault-indication, said back-up-protection means including a contact-member which by-passes said communicating-channel indication-means after a time sufficient for other circuit-interrupter means to have cleared the fault in the normal manner, said back-up-protection means further including a contact-member which eventually nullifies said out-of-step protective means after a long time-delay.

11. Protective equipment for a line-section of a polyphase synchronous transmission-line, comprising line-sectionalizing circuit-interrupter means and relaying means therefor at each end of the line-section being protected, each of said relaying means including a quick-acting phase directionally responsive relaying means responsive to phase-to-phase faults, a quick-acting ground directionally responsive relaying means responsive to ground faults, and a plurality of different fault-indicating quick-acting relaying means for responding to the presence of different types of faults on the transmission-line, only one of said fault-indicating means being responsive when there is a balanced polyphase fault without material ground current, another of said fault-indicating means being responsive to ground faults, a communicating channel between the two ends of the line-section being protected, means responsive to said directionally responsive quick-acting relaying means for transmitting a signal through said communicating channel to the other end of the line-section, trip-circuit means, at each end, for quickly actuating the circuit-interrupter means at its end of the protected line-section, said trip-circuit means being responsive to said communicating-channel signal, and being further responsive to either a joint internal-fault indication of said phase directionally responsive relaying means and an indication of fault-indicating means including the fault-indicating means which responds to said balanced polyphase faults, or a joint internal-fault indication of said ground directionally responsive relaying means and an indication of said ground-fault indicating means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, and back-up-protection means for providing delayed circuit-interrupter tripping in the event of a long-continued fault-indication, said back-up-protection means including a contact-member which eventually nullifies said out-of-step protective means after a long time-delay.

12. Protective equipment for a line-section of a polyphase synchronous transmission-line, comprising line-sectionalizing circuit-interrupter means and relaying means therefor at each end of the line-section being protected, each of said relaying means including a quick-acting phase directionally responsive relaying means responsive to phase-to-phase faults, a quick-acting ground directionally responsive relaying means responsive to ground faults, and a plurality of different fault-indicating quick-acting relaying means for responding to the presence of different types of faults on the transmission-line, only one of said fault-indicating means being responsive when there is a balanced polyphase fault without ground current, another of said fault-indicating means being responsive to ground faults, a communicating channel between the two ends of the line-section being protected, means responsive to said directionally responsive quick-acting relaying means for transmitting a signal through said communicating channel to the other end of the line-section, trip-circuit means, at each end, for quickly actuating the circuit-interrupter means at its end of the protected line-section, said trip-circuit means being responsive to said communicating-channel signal, and being further responsive to either a joint internal-fault indication of said phase directionally responsive relaying means and an indication of fault-indicating means including the fault-indicating means which responds to said balanced polyphase faults, or a joint internal-fault indication of said ground directionally responsive relaying means and an indication of said ground-fault indicating means, out-of-step protective means, for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, and back-up-protection means for providing delayed circuit-interrupter tripping in the event of a long-continued fault-indication, said back-up-protection means including a contact-member which by-passes said communicating-channel indication-means after a time sufficient for other circuit-interrupter means to have cleared the fault in the normal manner, said back-up-protection means further including a contact-member which eventually nullifies said out-of-step protective means after a long time-delay.

13. Protective relaying equipment for effecting a control of line-sectionalizing circuit-interrupter means for a transmission-line-section, comprising, at each end of the line-section being protected, relaying means including a directionally responsive quick-acting relaying means for responding selectively to faults accompanied by power-flow into the protected line-section, and a plurality of different fault-indicating quick-acting relaying means for responding to the presence of different types of faults on the transmission-line, only one of said fault-indicating means being responsive when there is a balanced polyphase fault without ground current, a communicating channel between the two ends of the line-section being protected, transmitter means disposed at each end of the line-section for normally continuously transmitting a signalling current through said communicating channel to the other end of the line-section, transmitter-controlling means responsive to said directionally responsive quick-acting relaying means for causing said transmitter to cease transmitting effective signalling currents, a receiver disposed at each end of the line-section and associated with said communication channel, trip-circuit means at each end, responsive to a failure of the receiver to receive a sufficient signalling current, and further responsive to an indication of any one of said fault-indicating means, and responsive also to the direction of power-current flow into the line-section being protected, for quickly energizing a control circuit for the circuit-interrupter means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, and time-delay means responsive to an ineffectual sustained failure of the receiver to receive a sufficient signalling current, without a concomitant energization of a trip-circuit means, for eventually rendering the receiver incapable of activating said trip-circuit means, but only after the expiration of the time required for the temporary protective measures of the out-of-step protective means.

14. Protective relaying equipment for effecting a control of line-sectionalizing circuit-interrupter means for a transmission-line-section, comprising, at each end of the line-section being protected, relaying means including a directionally responsive quick-acting relaying means for responding selectively to faults accompanied by power-flow into the protected line-section, and a plurality of different fault-indicating quick-acting relaying means for responding to the presence of different types of faults on the transmission-line, only one of said fault-indicating means being responsive when there is a balanced polyphase fault without ground current, a communicating channel between the two ends of the line-section being protected, transmitter means disposed at each end of the line-section for normally continuously transmitting a signalling current through said communicating channel to the other end of the line-section, transmitter-controlling means responsive to said directionally responsive quick-acting relaying means for causing said transmitter to cease transmitting effective signalling currents, a receiver disposed at each end of the line-section and associated with said communication channel, trip-circuit means at each end, responsive to a failure of the receiver to receive a sufficient signalling current, and further responsive to an indication of any one of said fault-indicating means, and responsive also to the direction of power-current flow into the line-section being protected, for quickly energizing a control circuit for the circuit-interrupter means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, back-up-protection means for providing delayed circuit-interrupter tripping in the event of a long-continued fault-indication, said back-up-protective means including a contact-member which by-passes said communicating-channel indication-means after a time sufficient for other circuit-interrupter means to have cleared the fault in the normal manner, said back-up-protection means further including a contact-member which eventually nullifies said out-of-step protective means after a long time-delay, and time-delay means responsive to an ineffectual sustained failure of the receiver to receive a sufficient signalling current, without a concomitant energization of a trip-circuit means, for eventually rendering the receiver incapable of activating said trip-circuit means, but only after the long time-delay introduced by the back-up protective means.

15. Protective relaying equipment for effecting a control of line-sectionalizing circuit-interrupter means for a transmission-line-section, comprising, at each end of the line-section being protected, relaying means including a directionally-responsive quick-acting relaying means for responding selectively to faults accompanied by power-flow into the protected line-section, and a plurality of different fault-indicating quick-acting relaying means for responding to the presence of different types of faults on the transmission-line, only one of said fault-indicating means being responsive when there is a balanced polyphase fault without ground current, a communicating channel between the two ends of the line-section being protected, transmitter means disposed at each end of the line-section for normally continuously transmitting a signalling current through said communicating channel to the other end of the line-section, transmitter-controlling means responsive to said directionally responsive quick-acting relaying means for causing said transmitter to cease transmitting effective signalling currents, a receiver disposed at each end of the line-section and associated with said communication channel, trip-circuit means at each end, responsive to a failure of the receiver to receive a sufficient signalling current, and further responsive to an indication of any one of said fault-indicating means, and responsive also to the direction of power-current flow into the line-section being protected, for quickly energizing a control circuit for the circuit-interrupter means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, a transmitter-supervisory relay responsive to the transmission of signalling current at each end of the protected line-section, and timer means disposed at each end of the protected line-section and operative, after a delay, in response to a deenergization of the transmitter-supervisory relay at that end, unaccompanied by a tripping function at that end, to thereafter render the receiver incapable of activating said trip-circuit means, but only after the expiration of the time required for the temporary protective measures of the out-of-step protective means.

16. Protective relaying equipment for effecting a control of line-sectionalizing circuit-interrupter means for a transmission-line-section, comprising, at each end of the line-section being protected, relaying means including a directionally responsive quick-acting relaying means for responding selectively to faults accompanied by power-flow into the protected line-section, and a plurality of different fault-indicating quick-acting relaying means for responding to the presence of different types of faults on the transmission line, only one of said fault-indicating means being responsive when there is a balanced polyphase fault without ground current, a communicating channel, between the two ends of the line-section being protected, transmitter means disposed at each end of the line-section for normally continuously transmitting a signalling current through said communicating channel to the other end of the line-section, transmitter-controlling means responsive to said directionally responsive quick-acting relaying means for causing said transmitter to cease transmitting effective signalling currents, a receiver disposed at each end of the line-section and associated with said communication channel, trip-circuit means at each end, responsive to a failure of the receiver to receive a sufficient signalling current, and further responsive to an indication of any one of said fault-indicating means, and responsive also to the direction of power-current flow into the line-section being protected, for quickly energizing a control circuit for the circuit-interrupter means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, back-up-protection means for providing delayed circuit-interrupter tripping in the event of a long-continued fault-indication, said back-up-protective means including a contact-member which by-passes said communicating- channel indication-means after a time sufficient for other circuit-interrupter means to have cleared the fault in the normal manner, said back-up-protection means further including a contact-member which eventually nullifies said out-of-step protective means after a long time-delay, a transmitter-supervisory relay responsive to the transmission of signalling current at each end of the protected line-section, and timer means disposed at each end of the protected line-section and operative, after a delay, in response to a deenergization of the transmitter-supervisory relay at that end, unaccompanied by a tripping function at that end, to thereafter render the receiver incapable of activating said trip-circuit means, but only after the long time-delay introduced by the back-up-protection means.

17. Protective equipment for a line-section of a polyphase synchronous transmission-line, comprising line-sectionalizing circuit-interrupter means and relaying means therefor at each end of the line-section being protected, each of said relaying means including a quick-acting phase directionally responsive relaying means responsive to phase-to-phase faults, a quick-acting ground directionally responsive relaying means responsive to ground faults, and a pluarilty of different fault-indicating quick-acting relaying means for responding to the presence of different types of faults on the transmission-line, only one of said fault-indicating means being responsive when there is a balanced polyphase fault without ground current, another of said fault-indicating means being responsive to ground faults, a communicating channel between the two ends of the line-section being protected, means responsive to said directionally responsive quick-acting relaying means for transmitting a signal through said communicating channel to the other end of the line-section, a back-up timer-controlling relay, trip-circuit means, at each end, for quickly actuating the circuit-interrupter means at its end of the protected line-section and for actuating said back-up timer-controlling relay, said trip-circuit means being responsive to said communicating-channel signal, and being further responsive to either a joint internal-fault indication of said phase directionally responsive relaying means and an indication of fault-indicating means including the fault indicating means which responds to said balanced polyphase faults, or a joint internal-fault indication of said ground directionally responsive relaying means and an indication of said ground-fault indicating means, out-of-step protective means for temporarily preventing an effective trip-circuit indication of the fault-indicating means which responds to said balanced polyphase faults, said out-of-step protective means being responsive to the continuance, for a time, of a response of said fault-indicating means which responds to said balanced polyphase faults, and being also responsive to the non-occurrence, during such time, of a communicating-channel signal-indication condition which would establish the presence of an internal fault somewhere between the ends of the protected line-section, a slowly operable back-up timer for providing delayed circuit-interrupter tripping in the event of a long-continued fault-indication, said back-up-protection means including a contact-member which by-passes said communicating-channel indication-means after a time, and means for energizing said back-up timer in response to a joint actuation of said back-up timer-controlling relay and an indication of fault-indicating means including the fault-indicating means which responds to said balanced polyphase faults.

18. Protective equipment for a line-section of a polyphase synchronous transmission-line comprising line-sectionalizing circuit-interrupter means and relaying means therefor at each end of the line-section being protected, each of said relaying means including a directionally responsive quick-acting relaying means for responding selectively to faults and a plurality of different fault-indicating quick-acting relaying means for responding to the presence of different types of faults on the transmission-line, only one of said fault-indicating means being responsive when there is balanced polyphase fault without material ground current, means for providing an intelligence-communicating channel between the two ends of the line-section being protected, auxiliary means associated with said intelligence-communicating channel for selectively cooperating with the directionally responsive means at the two ends of the protected line-section so as to provide a trip-circuit indication of the presence of an internal fault somewhere between the ends of the protected line-section, trip-circuit means, at each end, for quickly actuating the circuit-interrupter means at its end of the protected line-section, said trip-circuit means being responsive to said internal-fault communicating-channel indication and responsive also to an indication of any one of said fault-indicating means, and out-of-step protective means for temporarily preventing an effective trip-circuit indication of the fault-indicating means which responds to said balanced polyphase faults, said out-of-step protective means comprising a first relay responsive to the continuance, for a time, of a response of said fault-indicating means which responds to said balanced polyphase faults, and also responsive to the non-occurrence, during such time, of a communicating-channel signal-indication condition which would establish the presence of an internal fault somewhere between the ends of the protected line-section, a second relay and a third relay both responsive to the energization of said first relay, means responsive to the non-actuation of the first relay to insure the deenergization of the second relay, means responsive to the simultaneous non-actuations of the first and second relays to insure the deenergization of the third relay, and means responsive to the energization of the third relay for both establishing a holding circuit for the second and third relays, and preventing said effective trip-circuit indication of the fault-indicating means which responds to said balanced polyphase faults, said third relay being slow in its drop-out function.

19. Protective equipment for a line-section of a polyphase synchronous transmission-line comprising line-sectionalizing circuit-interrupter means and relaying means therefor at each end of the line-section being protected, each of said relaying means including a directionally-responsive quick-acting relaying means for responding selectively to faults and a plurality of different fault-indicating quick-acting relaying means for responding to the presence of different types of faults on the transmission-line, only one of said fault-indicating means being responsive when there is a balanced polyphase fault without ground current, means for providing an intelligence-communicating channel between the two ends of the line-section being protected, auxiliary means associated with said intelligence-communicating channel for selectively cooperating with the directionally responsive means at the two ends of the protected line-section so as to provide a trip-circuit indication of the presence of an internal fault somewhere between the ends of the protected line-section, trip-circuit means, at each end, for quickly actuating the circuit-interrupter means at its end of the protected line-section, said trip-circuit means being responsive to said internal-fault communicating-channel indication and responsive also to an indication of any one of said fault-indicating means, and out-of-step protective means for temporarily preventing an effective trip-circuit indication of the fault-indicating means which responds to said balanced polyphase faults, said out-of-step protective means comprising a first relay responsive to a response of said fault-indicating means which responds to said balanced polyphase faults, and also responsive to the non-occurrence of a communicating-channel signal-indication condition which would establish the presence of an internal fault somewhere between the ends of the protected line-section, a second relay and a third relay both responsive to the energization of said first relay, but only after a time-hesitation at least approximately sufficient for an effective quick internal-fault relaying operation to have first been made if it was going to be made, means responsive to the non-actuation of the first relay to insure the deenergization of the second relay, means responsive to the simultaneous non-actuations of the first and second relays to insure the deenergization of the third relay, and means responsive to the energization of the third relay for both establishing a holding circuit for the second and third relays, and preventing said effective trip-circuit indication of the fault-indicating means which responds to said balanced polyphase faults, said third relay being slow in its drop-out function.

20. Protective equipment for a line-section of a synchronous alternating-current transmission system, comprising a relaying station, line-sectionalizing circuit-interrupter means at said station, relaying means at both ends of the line-section being protected, a communicating channel between the two ends of the line-section, said relaying means including means associated with the communicating channel for securing, at said relaying station, discriminatory indications of internal fault-conditions accompanied by power-direction into the protected line-section at both ends thereof and external fault-conditions accompanied by power-direction into the protected line-section at one end and out at the other, said internal-fault indicating means further discriminating between an out-of-step fault-indication which is obtained during out-of-synchronism operation of the transmission system and another fault-indication which is not obtained during out-of-synchronism operation, said external-fault indicating means being responsive to a fault-indication of a type which is obtained during out-of-synchronism operation, means at said relaying station for normally quickly actuating said circuit-interrupter means in response to either one of said internal-fault indications, and means responsive to an external-fault indication of a type which is obtained during out-of-synchronism operation for thereafter selectively interposing an impediment against the immediate quick actuation of said circuit-interrupter means in response to a subsequent internal out-of-step fault-indication, without impeding the quick actuation of said circuit-interrupter means in response to a subsequent other internal-fault indication.

WILLIAM A. LEWIS.